(12) United States Patent
Thellend

(10) Patent No.: US 9,089,904 B2
(45) Date of Patent: Jul. 28, 2015

(54) CORE BARREL HOLDER AND METHODS OF USING SAME

(71) Applicant: LONGYEAR TM, INC., South Jordan, UT (US)

(72) Inventor: Robert H. Thellend, Kamloops (CA)

(73) Assignee: Longyear TM, Inc., South Jordan, UT (US)

( * ) Notice: Subject to any disclaimer, the term of this patent is extended or adjusted under 35 U.S.C. 154(b) by 469 days.

(21) Appl. No.: 13/666,059

(22) Filed: Nov. 1, 2012

(65) Prior Publication Data

US 2014/0117607 A1 May 1, 2014

(51) Int. Cl.
*B23Q 3/00* (2006.01)
*B23B 51/04* (2006.01)
*E21B 25/00* (2006.01)

(52) U.S. Cl.
CPC ............. *B23B 51/044* (2013.01); *E21B 25/005* (2013.01)

(58) Field of Classification Search
CPC ............................. B23B 51/044; E21B 25/005
USPC ............ 254/102, 134, 2 B; 269/287, 154 CS, 269/289 R, 46, 58
See application file for complete search history.

(56) References Cited

U.S. PATENT DOCUMENTS

| | | |
|---|---|---|
| 4,142,594 A | 3/1979 | Thompson et al. |
| 4,989,678 A | 2/1991 | Thompson |
| 5,322,133 A | 6/1994 | Hart |
| 6,098,724 A | 8/2000 | Ricker |
| 7,380,615 B1 | 6/2008 | Vanearden |
| 7,478,794 B1 * | 1/2009 | Gohlke et al. ........ 254/134.3 FT |
| 2011/0127054 A1 * | 6/2011 | Chen .............................. 173/114 |

OTHER PUBLICATIONS

International Search Report and Written Opinion of the International Search Authority for Application No. PCT/US2012/063006 (mailed Aug. 22, 2014).

\* cited by examiner

*Primary Examiner* — Lee D Wilson
*Assistant Examiner* — Nirvana Deonauth
(74) *Attorney, Agent, or Firm* — Ballard Spahr LLP

(57) ABSTRACT

A core barrel holder for supporting a core barrel during removal of a core sample from the core barrel. The core barrel holder includes a housing, an inner sleeve, a plurality of support elements extending radially inwardly within the inner sleeve, a spring, and a cap. Upon positioning of the core barrel holder in an operative position, the inner sleeve receives the core barrel. Upon advancement of the core barrel through the inner sleeve, the plurality of support elements frictionally engage the core barrel within the inner sleeve.

20 Claims, 12 Drawing Sheets ative position, the proximal opening of the inner sleeve can receive the core barrel. Upon advancement of the core barrel through the interior space of the inner sleeve relative to the longitudinal axis of the core barrel holder, the distal engagement surface of the support portion can engage the distal landing portion of the housing, and the plurality of support elements can frictionally engage the core barrel within the inner sleeve.

CORE BARREL HOLDER AND METHODS OF USING SAME

FIELD

This application relates generally to apparatus and methods for securing a core barrel during removal of a sample from the core barrel.

BACKGROUND

During a typical drilling operation, a drill string is advanced to a desired location within a surface formation, and core barrels within the drill string are used to collect core samples from within the surface formation. While containing a core sample, a core barrel often weights between 70 and 80 pounds. Conventionally, following the retrieval of core samples by a core barrel, workers are required to manually support the weight of the core barrel in an angular orientation (often at about 45 degrees) that permits extraction of the core sample. Frequently, to accomplish extraction of the core sample, workers are required to position a core barrel on a table, lift a portion of the core barrel from the table, and then hammer the core barrel until the core sample is recovered. These conventional procedures are inefficient and are often associated with injuries to workers and/or damage to equipment.

Accordingly, there is a need in the pertinent art for apparatus and methods for supporting a core sample in a manner that permits extraction of a core sample from a core barrel while reducing and/or eliminating the manual handling and space requirements of conventional techniques.

SUMMARY

Described herein is a core barrel holder for supporting a core barrel during removal of a core sample from the core barrel. The core barrel holder has a longitudinal axis. The core barrel holder includes a housing having proximal and distal openings, a proximal surface, an outer surface, and an inner surface with a proximal portion and a distal landing portion. The core barrel holder also includes an inner sleeve having an outer surface, an inner surface, and a support portion positioned between proximal and distal openings of the inner sleeve along a longitudinal length of the inner sleeve. The inner surface of the inner sleeve defines an interior space within the inner sleeve. The support portion of the inner sleeve extends radially outwardly from an outer surface of the inner sleeve and defines a proximal engagement surface, a distal engagement surface, and a plurality of bores radially spaced about the inner sleeve.

Additionally, the core barrel holder includes a plurality of support elements received within respective bores of the plurality of bores of the support portion of the inner sleeve. Each support element can be received within a respective bore such that a portion of the support element projects inwardly from an inner surface of the inner sleeve (into the interior space of the inner sleeve). The core barrel holder can further include a spring having a proximal end and a distal end. The core barrel holder can still further include a cap having an inner surface, an outer surface, and a proximal lip portion and defining a proximal opening and a distal opening. The proximal lip portion of the cap can extend radially inwardly from the inner surface of the cap relative to the longitudinal axis of the core barrel holder.

In an operative position of the core barrel holder, the inner sleeve is received through the proximal opening of the housing such that the support portion of the inner sleeve is positioned within the interior space of the housing, the spring is positioned such that the distal end of the spring engages the proximal engagement surface of the support portion of the inner sleeve, the outer surface of the cap engages the proximal portion of the inner surface of the housing, and the inner engagement surface of the lip portion of the cap engages the proximal end of the spring. In the oper- Methods of using the described core barrel holder are also disclosed.

BRIEF DESCRIPTION OF THE DRAWINGS

These and other features of the preferred embodiments of the invention will become more apparent in the detailed description in which reference is made to the appended drawings wherein:

FIG. 4A displays an exemplary ball and a corresponding bore, which, in exemplary core barrel holders, can be positioned within a first row of bores defined within a support portion of an inner sleeve as described herein. FIG. 4B displays another exemplary ball and a corresponding bore, which, in exemplary core barrel holders, can be positioned within a first row of bores defined within a support portion of an inner sleeve as described herein.

FIG. 7 displays the positioning of the core barrel holder in an operative position, as described herein.

FIG. 11 provides schematic diagrams showing various angular orientations of a core barrel holder when used in a core barrel support system as described herein.

DETAILED DESCRIPTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a support element" can include two or more such support elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

Figure 1:
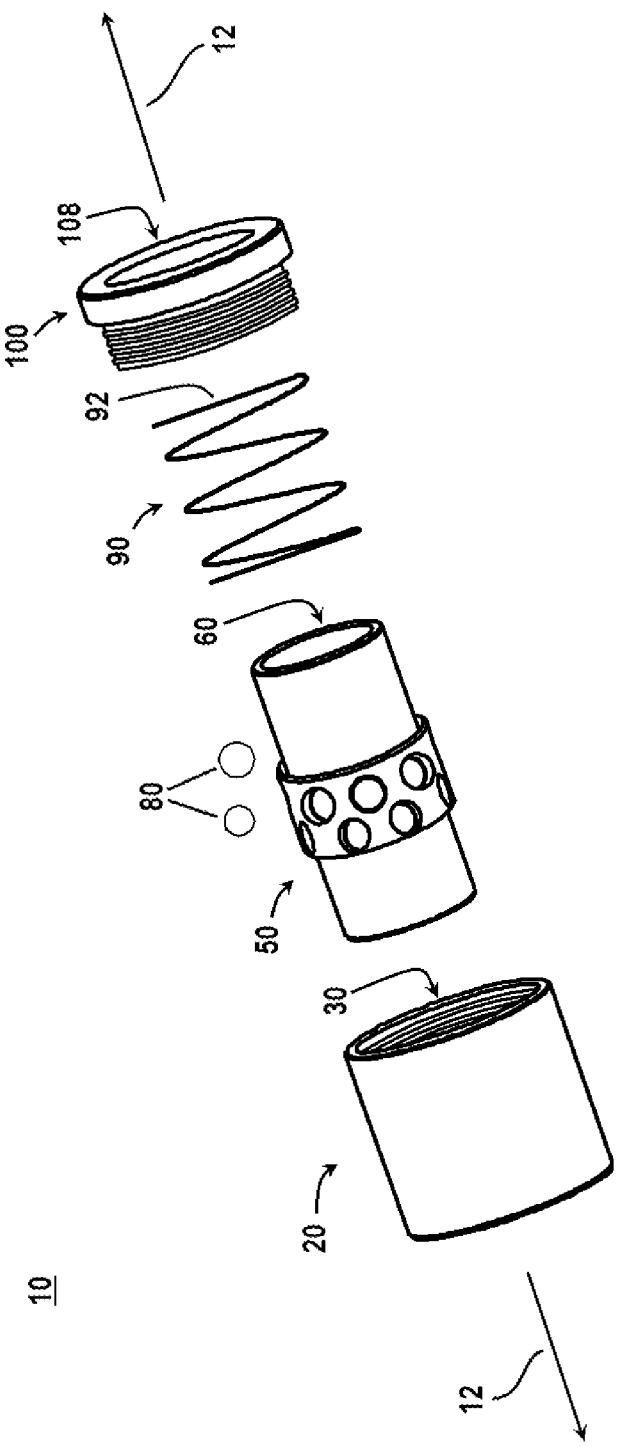
FIG. 1 is an exploded perspective view of an exemplary core barrel holder as described herein.

Described herein with reference to FIGS. 1-7 is a core barrel holder 10 for supporting a core barrel during removal of a core sample from the core barrel. As shown in FIGS. 1 and 7, the core barrel holder 10 has a longitudinal axis 12.

Figure 2:
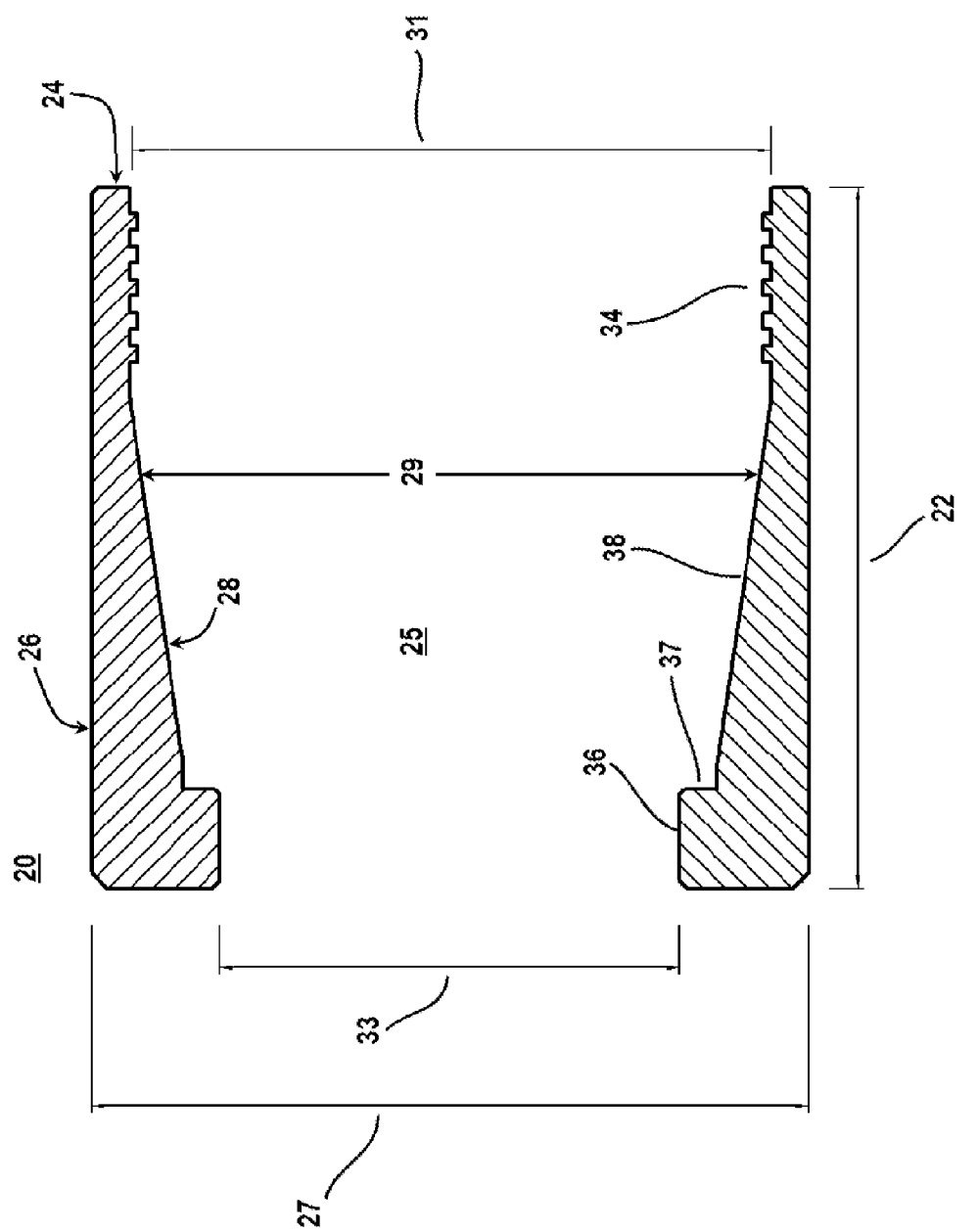
FIG. 2 is a cross-sectional side view of a housing of an exemplary core barrel holder as described herein.

In one aspect, and with reference to FIG. 2, the core barrel holder 10 can comprise a housing 20 having a longitudinal length 22, a proximal surface 24, an outer surface 26, and an inner surface 28. In this aspect, the housing 20 can have an outer diameter 27 (defined by the outer surface 26) and an inner diameter 29 (defined by the inner surface 28). It is contemplated that the inner surface 28 of the housing 20 can define an interior space 25 of the housing. In exemplary aspects, it is contemplated that the longitudinal length 22 of the housing 20 can range from about 100 mm to about 150 mm and, more preferably, range from about 115 mm to about 135 mm. However, it is further contemplated that the housing 20 can have any longitudinal length 22 that maintains the functional characteristics of the core barrel holder 10 described herein.

In another aspect, the housing 20 can define a proximal opening 30 and a distal opening 32. In this aspect, the proximal opening 30 of the housing 20 can have a diameter 31 (including any thread), while the distal opening 32 of the housing can have a diameter 33. In exemplary aspects, the diameter 31 of the proximal opening 30 of the housing 20 can be greater than the diameter 33 of the distal opening 32 of the housing. In these aspects, it is contemplated that the diameter 31 of the proximal opening 30 can range from about 80 mm to about 140 mm and, more preferably, from about 90 mm to about 130 mm. It is further contemplated that the diameter 33 of the distal opening 32 can range from about 50 mm to about 100 mm and, more preferably, from about 60 mm to about 90 mm.

In additional aspects, the inner surface 28 of the housing 20 can have a proximal portion 34 and a distal landing portion 36. Optionally, the proximal portion 34 of the inner surface 28 of the housing 20 can be threaded. In exemplary aspects, it is contemplated that the distal landing portion 36 can extend inwardly from the inner surface 28 of the housing 20 relative to the longitudinal axis 12 of the core barrel holder 10. It is further contemplated that the distal landing portion 36 can define a landing surface 37 oriented substantially perpendicularly to the longitudinal axis 12 of the core barrel holder 10. It is still further contemplated that the inner diameter 29 of the housing 20 within the distal landing portion 36 can substantially correspond to the diameter 33 of the distal opening 32 of the housing 20.

In a further aspect, the inner surface 28 of the housing 20 can have a central portion 38 positioned between the proximal portion 34 and the distal landing portion 36 of the inner surface 28 along the longitudinal length 22 of the housing. Optionally, in this aspect, and as shown in FIG. 2, at least a portion of the central portion 38 of the inner surface 28 can be inwardly tapered relative to the longitudinal axis 12 of the core barrel holder 10 moving along the longitudinal length of the housing 20 from the proximal portion 34 of the inner surface toward the distal landing portion 36 of the inner surface. In exemplary aspects, it is contemplated that the central portion 38 of the inner surface 28 can comprise a tapered portion and a straight portion, with the tapered portion being angularly oriented relative to the longitudinal axis 12 of the core barrel holder 10 and the straight portion being substantially parallel to the longitudinal axis of the core barrel. In these aspects, as shown in FIG. 2, it is contemplated that the straight portion of the central portion 38 of the inner surface 28 can be positioned proximate the distal landing surface 37. In further aspects, it is contemplated that the tapered portion of the central portion 38 of the inner surface 28 can be inwardly tapered at a selected angle relative to the longitudinal axis 12 of the core barrel holder 10. In exemplary aspects, the selected angle at which the central portion 38 is tapered can range from about 5 degrees to about 15 degrees relative to the longitudinal axis 12 of the core barrel holder 10 and, more preferably, can be about 8 degrees.

In exemplary aspects, it is contemplated that the proximal portion 34, the distal landing portion 36, and the central portion 38 of the inner surface 28 can have respective longitudinal lengths, with the longitudinal length of the proximal portion ranging from about 25 mm to about 50 mm, the longitudinal length of the central portion ranging from about 55 mm to about 85 mm, and the longitudinal length of the distal landing portion ranging from about 15 mm to about 25 mm.

Figure 3:
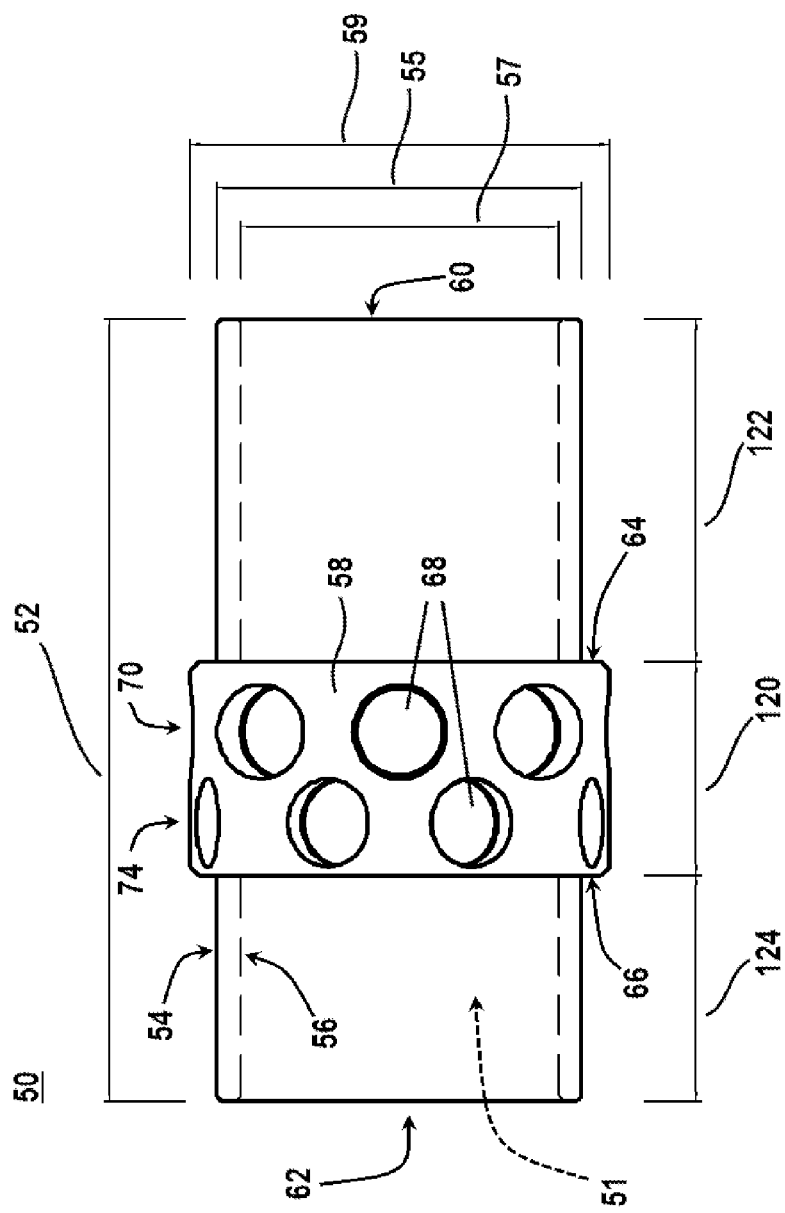
FIG. 3 is a partially transparent side perspective view of an inner sleeve of an exemplary core barrel holder as described herein.
Figure 4A:
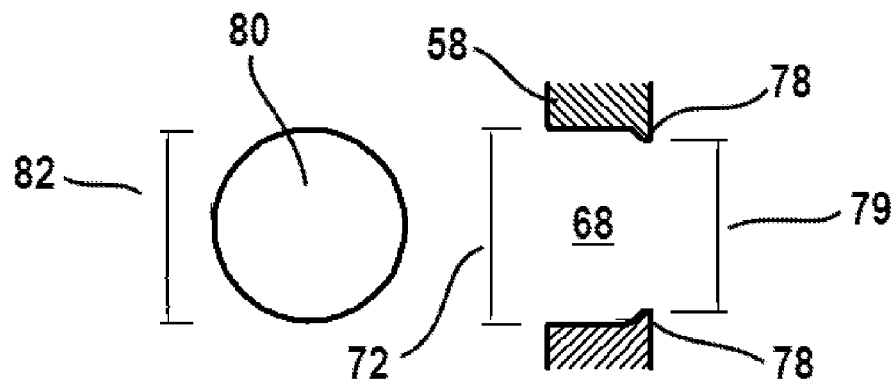
FIGS. 4A and 4B depict exemplary support elements and bores of an exemplary core barrel holder as described herein.
Figure 4B:
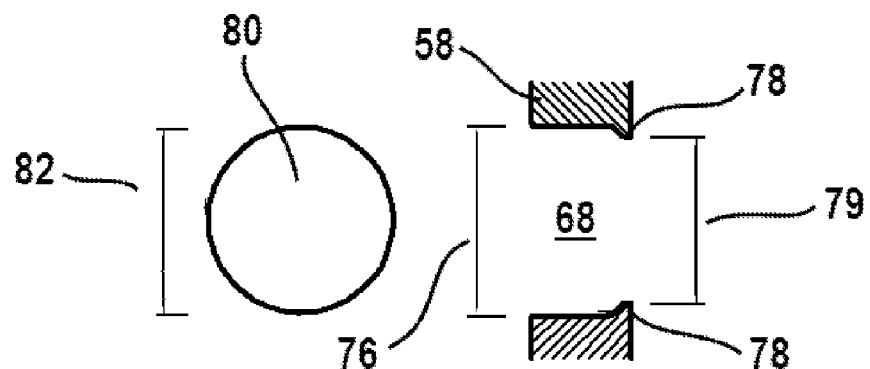

In another aspect, and with reference to FIG. 3, the core barrel holder 10 can comprise an inner sleeve 50 having a longitudinal length 52, an outer surface 54, an inner surface 56, and a support portion 58. In this aspect, the inner sleeve 50 can have an outer diameter 55 (defined by the outer surface 54) and an inner diameter 57 (defined by the inner surface 56). As shown in FIG. 3, the inner surface 56 of the inner sleeve 50 can define an interior space 51 of the inner sleeve.

In an additional aspect, the inner sleeve 50 can define a proximal opening 60 and a distal opening 62. Optionally, in this aspect, the proximal opening 60 of the inner sleeve 50 and the distal opening 62 can each have a diameter corresponding to the inner diameter 57 of the inner sleeve. In a further aspect, the support portion 58 of the inner sleeve 50 can be positioned between the proximal and distal openings 60, 62 along the longitudinal length 52 of the inner sleeve.

In exemplary aspects, the support portion 58 of the inner sleeve 50 extends radially outwardly from the outer surface 54 of the inner sleeve relative to the longitudinal axis 12 of the core barrel holder 10. Thus, it is contemplated that the support portion 58 of the inner sleeve 50 can have an outer diameter 59 that is greater than the outer diameter 55 of the remainder of the inner sleeve. In these aspects, the support portion 58 of the inner sleeve 50 can define a proximal engagement surface 64 and a distal engagement surface 66. It is further contemplated that the outer diameter 59 of the support portion 58 can range from about 60 mm to about 120 mm and, more preferably, can range from about 70 mm to about 110 mm.

Optionally, in another aspect, and with reference to FIG. 3, the support portion 58 of the inner sleeve 50 can have a longitudinal length 120 ranging from about 40 mm to about 60 mm and, more preferably, from about 45 mm to about 55 mm. In this aspect, it is contemplated that the support portion 58 can be positioned such that the proximal engagement surface 64 of the support portion is spaced from the proximal opening 60 of the inner sleeve 50 by a selected distance 122. It is further contemplated that the support portion 58 can be positioned such that the distal engagement surface 66 of the support portion is spaced from the distal opening 62 of the inner sleeve 50 by a selected distance 124. In exemplary aspects, the selected distance 122 can range from about 60 mm to about 100 mm and, more preferably, can range from about 70 mm to about 90 mm. In these aspects, it is contemplated that the selected distance 124 can range from about 40 mm to about 70 mm and, more preferably, can range from about 50 mm to about 60 mm.

In a further aspect, the support portion 58 of the inner sleeve 50 can define a plurality of bores 68. It is contemplated that the plurality of bores 68 can be radially spaced about the longitudinal axis 12 of the core barrel holder 10. It is further contemplated that each bore 68 of the plurality of bores can extend from the inner surface 56 to the outer surface 54 of the inner sleeve 50. Optionally, in one aspect, the plurality of bores 68 of the support portion 58 of the inner sleeve 50 can comprise a first row 70 of bores and a second row 74 of bores. In this aspect, it is contemplated that the first row 70 of bores 58 can be offset from the second row 74 of bores along the longitudinal length 52 of the inner sleeve 50. In another aspect, and with reference to FIGS. 4A-4B, the first row 70 of bores 58 can comprise a plurality of bores having a first diameter 72 while the second row 74 of bores can comprise a plurality of bores having a second diameter 76. In a further aspect, the first row 70 of bores 68 can be positioned between the proximal engagement surface 64 of the support portion 58 of the inner sleeve 50 and the second row 74 of bores along the longitudinal length 52 of the inner sleeve. Optionally, in this aspect, it is contemplated that the first diameter 72 can be larger than the second diameter 76. It is further contemplated that the first diameter 72 can range from about 20 mm to about 25, while the second diameter 76 can range from about 18 mm to about 22 mm.

It is contemplated that the longitudinal length 52 of the inner sleeve can range from about 150 mm to about 220 mm and, more preferably, can range from about 170 mm to about 200 mm. It is contemplated that the outer diameter 55 of the inner sleeve 50 can range from about 50 mm to about 100 mm and, more preferably, can range from about 60 mm to about 90 mm. It is contemplated that the outer diameter 59 of the support portion 58 of the inner sleeve 50 can range from about 60 mm to about 120 mm and, more preferably, can range from about 70 mm to about 110 mm. It is still further contemplated that the inner diameter 57 of the inner sleeve 50 can range from about 40 mm to about 90 mm and, more preferably, can range from about 50 mm to about 80 mm. In exemplary aspects, the outer diameter 59 of the support portion 58 of the inner sleeve 50 can be greater than the diameter 33 of the distal opening 32 of the housing 20.

In further aspects, the core barrel holder 10 can further comprise a plurality of support elements 80. In these aspects, it is contemplated that each support element 80 of the plurality of support elements can be received within a respective bore 68 of the plurality of bores of the support portion 58 of the inner sleeve 50 such that a portion of the support element projects inwardly from the inner surface 56 of the inner sleeve (relative to the longitudinal axis 12 of the core barrel holder) within the interior space 51 of the inner sleeve. It is contemplated that the plurality of support elements 80 can project inwardly within the interior space 51 of the inner sleeve 50 to thereby define an operative inner diameter of the inner sleeve that is less than an outer diameter of a core barrel to be positioned within the inner sleeve. Optionally, it is further contemplated that each support element 80 of the plurality of support elements can be received within a respective bore 68 of the plurality of bores of the support portion 58 of the inner sleeve 50 such that a portion of the support element projects outwardly from the outer surface 54 of the inner sleeve (relative to the longitudinal axis 12 of the core barrel holder). In operation, each support element 80 of the plurality of support elements can be moveable within a respective bore 68 of the plurality of bores of the support portion 58 of the inner sleeve 50. In a further aspect, each support element 80 of the plurality of support elements can be mechanically deformable. As used herein, the term "mechanically deformable" refers to any deformation that is brought about by physical contact (and application of forces) between the a support element and another physical structure, including, for example and without limitation, the housing, the inner sleeve, and/or a core barrel.

In exemplary aspects, the plurality of support elements 80 can comprise a plurality of balls. In these aspects, each ball of the plurality of balls can have a diameter 82. Optionally, when the plurality of bores 68 of the support portion 58 of the inner sleeve 50 comprise first and second rows 70, 74 of bores, it is contemplated that the balls of the plurality of balls that are positioned within the first row of bores can have a larger diameter than the balls of the plurality of balls that are positioned within the second row of bores. For example, it is contemplated that the balls positioned within the first row 70 of bores can each have a diameter ranging from about 21 mm to about 23 mm, while the balls positioned within the second row 74 of bores can each have a diameter ranging from about 18 mm to about 20 mm.

Optionally, in exemplary aspects, and as shown in FIG. 4, the support portion 58 of the inner sleeve 50 can comprise a plurality of projections 78, with each projection of the plurality of projections being defined within a respective bore 68 of the plurality of bores. In these aspects, each projection 78 of the plurality of projections can radially surround at least a portion of a respective bore 68. It is contemplated that each projection 78 of the plurality of projections can be positioned proximate the outer surface 54 of the inner sleeve 50. It is contemplated that the plurality of projections 78 of the support portion 58 of the inner sleeve 50 can be configured to retain the plurality of support elements 80 (such as, for example, balls) within the plurality of bores 68. It is further contemplated that, during advancement of a core barrel through the inner sleeve 50 as described herein, upon contact between the core barrel and the plurality of support elements 80 within the interior space 51 of the inner sleeve, the plurality of projections 78 can restrict movement of the support elements 80 within their respective bores 68 and retain the support elements within their respective bores.

In a further aspect, the core barrel holder 10 can comprise means for axially biasing the support portion 58 of the inner sleeve 50 toward the distal landing portion 36 of the housing 20 relative to the longitudinal axis 12 of the core barrel holder.

Figure 5:
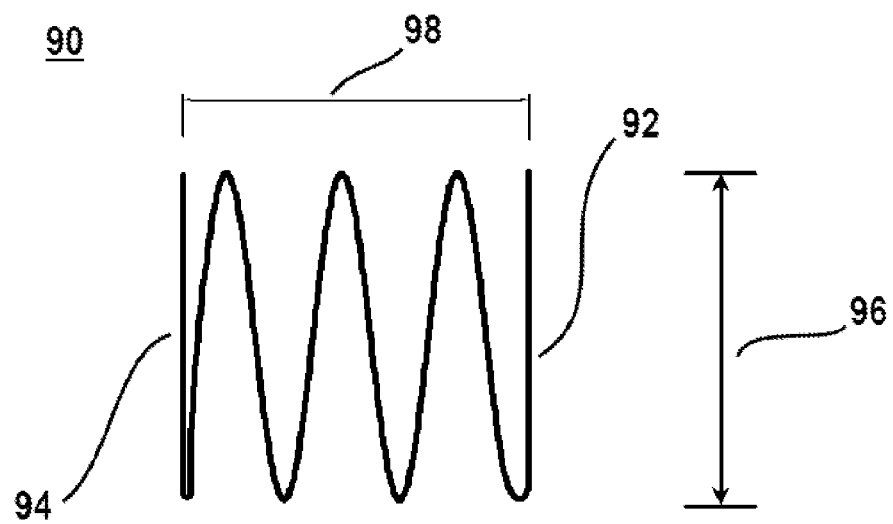
FIG. 5 is a side perspective view of a spring of an exemplary core barrel holder as described herein.
Figure 6:
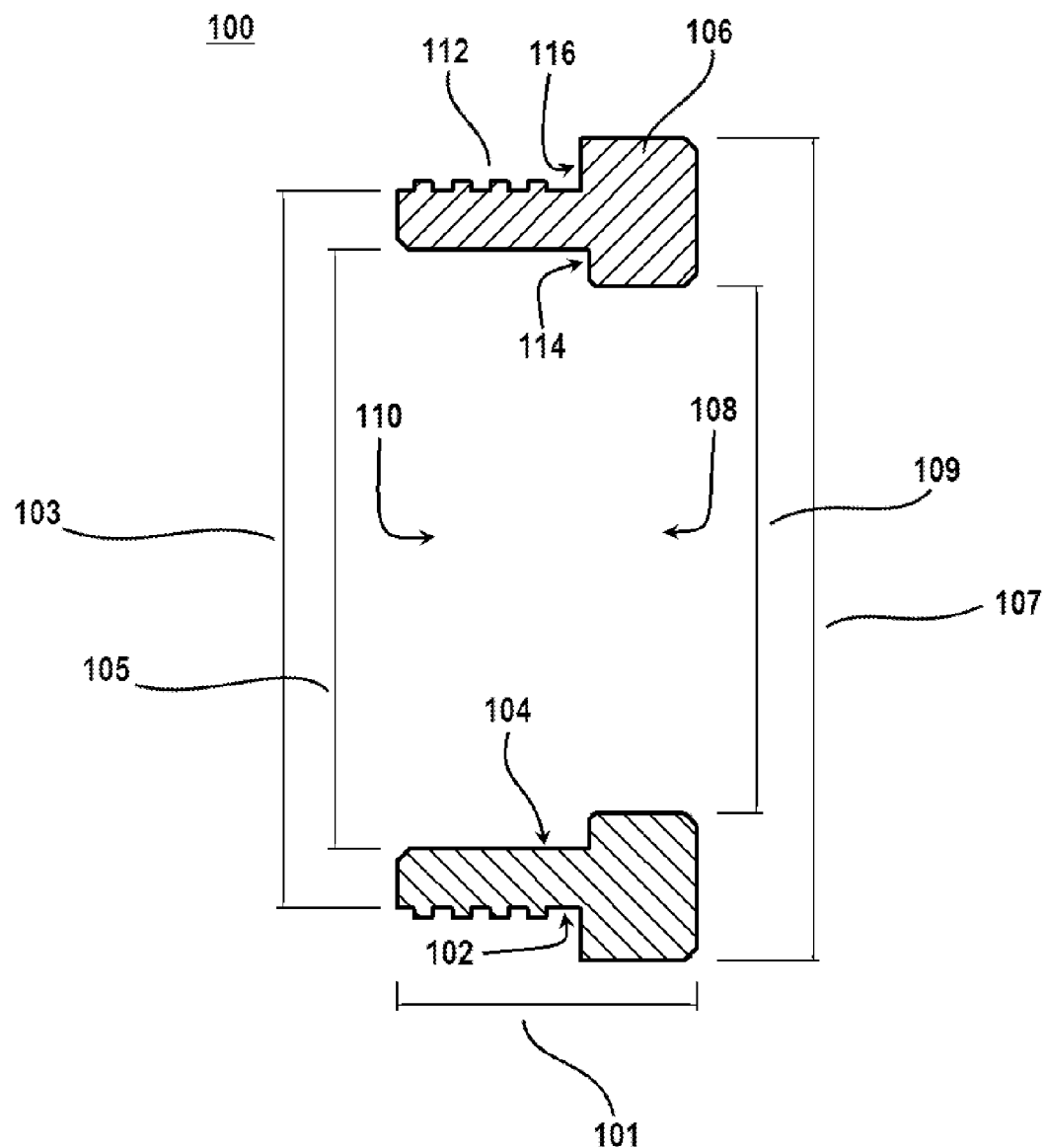
FIG. 6 is a cross-sectional side view of a cap of an exemplary core barrel holder as described herein.

In exemplary aspects, the means for axially biasing the support portion 58 can comprise a spring 90 and a cap 100, as shown in FIGS. 5 and 6. In these aspects, the spring 90 can have a proximal end 92 and a distal end 94. In this aspect, it is contemplated that the spring can have an inner diameter 96 and a longitudinal length 98. In exemplary aspects, the inner diameter 96 of the spring 90 can be greater than the outer diameter 55 of the inner sleeve 50, and the distal end 94 of the spring 90 can be configured to engage the proximal engagement surface 64 of the support portion 58 of the inner sleeve. It is contemplated that the inner diameter 96 of the spring 90 can range from about 50 mm to about 110 mm and, more preferably, from about 60 mm to about 100 mm. It is further contemplated that the longitudinal length 98 of the spring 90 can range from about 60 mm to about 120 mm and, more preferably, from about 70 mm to about 110 mm.

In a further aspect, the cap 100 can have a longitudinal length 101, an outer surface 102, an inner surface 104, and a proximal lip portion 106. In this aspect, the outer surface 102 can define an outer diameter 103 (not including thread) of the cap 100, while the inner surface 104 can define an inner diameter 105 of the cap. It is contemplated that the outer diameter 103 can range from about 80 mm to about 140 mm and, more preferably, can range from about 100 mm to about 120 mm. It is further contemplated that the inner diameter 105 can range from about 60 mm to about 120 mm and, more preferably, can range from about 80 mm to about 100 mm. In another aspect, the proximal lip portion 106 can extend radially inwardly from the inner surface 104 of the cap 100 relative to the longitudinal axis 12 of the core barrel holder 10. In this aspect, the proximal lip portion 106 can define an inner engagement surface 114. Optionally, in a further aspect, the proximal lip portion 106 can extend radially outwardly from the outer surface 102 of the cap 100 relative to the longitudinal axis 12 of the core barrel holder 10. Thus, it is contemplated that the proximal lip portion 106 can have an outer diameter 107 that is greater than the outer diameter 103 of the cap 100. In this aspect, the proximal lip portion 106 can define an outer engagement surface 116. It is contemplated that the outer diameter 107 of the proximal lip portion 106 can range from 100 mm to about 150 mm and, more preferably, can range from about 110 mm to about 140 mm. Optionally, in another aspect, the outer surface 102 of the cap 100 can have a distal threaded portion 112.

In additional exemplary aspects, the cap 100 can define a proximal opening 108 and a distal opening 110. In these aspects, the proximal opening 108 can have a diameter 109, and the distal opening 110 can have a diameter that substantially corresponds to the inner diameter 105 of the cap 100. It is contemplated that the diameter 109 of the proximal opening 108 of the cap 100 can be greater than the outer diameter 55 of the inner sleeve 50. It is further contemplated that the diameter 109 of the proximal opening 108 can range from about 50 mm to about 110 mm and, more preferably, can range from about 60 mm to about 90 mm. Optionally, the proximal opening 108 can be defined by the proximal lip portion 106.

Figure 7A:
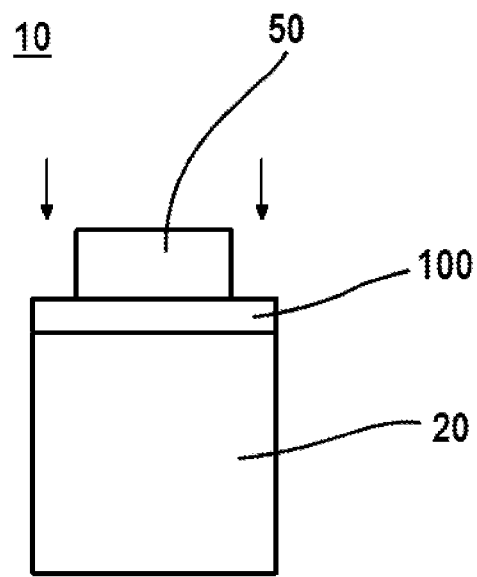
FIG. 7A depicts the core barrel holder during positioning of an inner sleeve within the interior space of the housing (prior to positioning of the core barrel holder in the operative position).
Figure 7B:
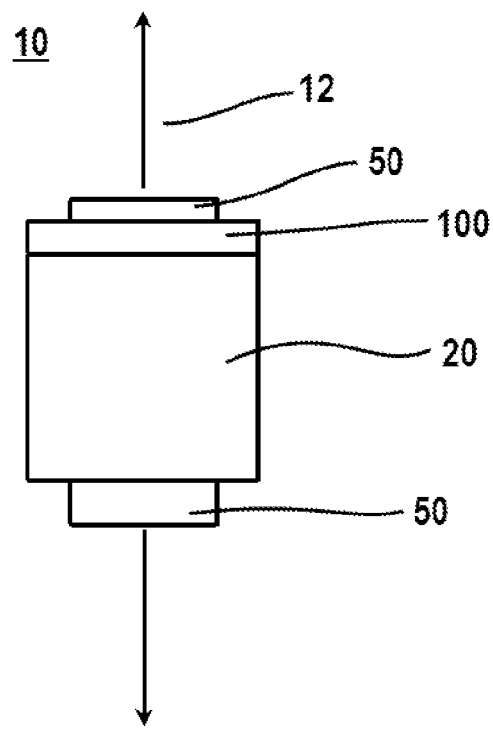
FIG. 7B depicts the core barrel holder in the operative position as described herein.

In use, and with reference to FIGS. 7A and 7B, the core barrel holder 10 can be positioned in an operative position. It is contemplated that the operative position can correspond to a position of the core barrel holder 10 in which the core barrel holder is configured to support a core barrel during removal of a core sample from the core barrel. In one aspect, in the operative position of the core barrel holder 10, the inner sleeve 50 can be received through the proximal opening 30 of the housing 20 such that the inner sleeve is positioned within the interior space 25 of the housing. In another aspect, in the operative position of the core barrel holder 10, the spring 90 can be positioned such that the distal end 94 of the spring engages the proximal engagement portion 64 of the support portion 58 of the inner sleeve 50. In an additional aspect, in the operative position of the core barrel holder 10, the outer surface 102 of the cap 100 can engage the proximal portion 34 of the inner surface 28 of the housing 20. In this aspect, when the proximal portion 34 of the inner surface 28 of the housing 20 is threaded and the distal portion 112 of the cap 100 is threaded, it is contemplated that the distal threaded portion of the cap can be configured for threaded engagement with the proximal threaded portion of the inner surface of the housing. In a further aspect, in the operative position of the core barrel holder 10, the inner engagement surface 114 of the proximal lip portion 106 of the cap 100 can engage the proximal end 92 of the spring 90. Optionally, in still a further aspect, in the operative position of the core barrel holder 10, the outer engagement surface 116 of the cap 100 can be configured for engagement with the proximal surface 24 of the housing 20. In this aspect, it is contemplated that the outer diameter 107 of the proximal lip portion 106 of the cap 100 can be substantially equal to the outer diameter 27 of the housing 20. Thus, it is further contemplated that, in the operative position of the core barrel holder 10, the proximal lip portion 106 of the cap 100 can be substantially flush with the outer surface 26 of the housing 20.

In exemplary aspects, it is contemplated that, in the operative position of the core barrel holder 10, the proximal opening 60 of the inner sleeve 50 can be configured to receive the core barrel. In these aspects, it is further contemplated that, upon advancement of the core barrel through the interior space 51 of the inner sleeve 50 relative to the longitudinal axis 12 of the core barrel holder 10, the distal engagement surface 66 of the support portion 58 of the inner sleeve can be configured to engage the distal landing portion 36 (and at least a portion of landing surface 37) of the housing 20, and the plurality of support elements 80 can be configured to frictionally engage the core barrel within the inner sleeve. FIGS. 7A and 7B respectively demonstrate the position of the inner sleeve 50 before and after engagement with the distal landing portion 36 of the housing 20.

In additional exemplary aspects, after positioning of the core barrel within the inner sleeve 50, and following engagement between the distal engagement surface 66 of the support portion 58 and the distal landing portion 36 of the housing 20, it is contemplated that further advancement of the core barrel can cause deformation of the plurality of support elements 80 positioned within the bores 68 of the support portion 58. In these aspects, it is further contemplated that each support element 80 of the plurality of support elements can be positioned between the core barrel, the housing 20, and the inner sleeve 50 such that advancement of the core barrel relative to the longitudinal axis 12 of the core barrel holder 10 effects deformation of the support elements within the interior space 51 of the inner sleeve. Consequently, it is contemplated that, upon further advancement of the core barrel relative to the longitudinal axis 12 of the core barrel holder 10, the core barrel can become frictionally engaged with the plurality of support elements 80 and, eventually, can become supported within the inner sleeve 50 in an interference and/or jam-type fit.

Figure 11A:
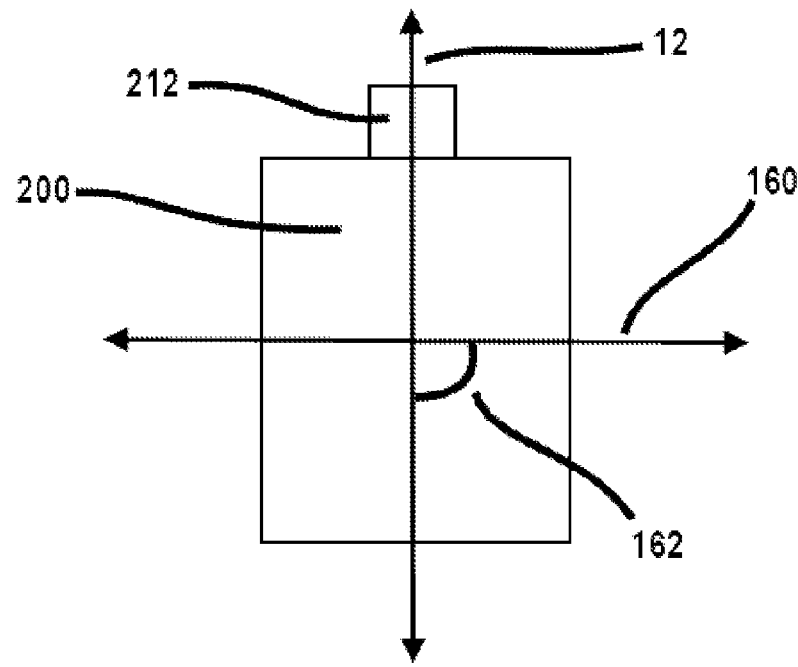
FIGS. 11A and 11B depict the core barrel holder at exemplary angular orientations relative to a horizontal plane.
Figure 11B:
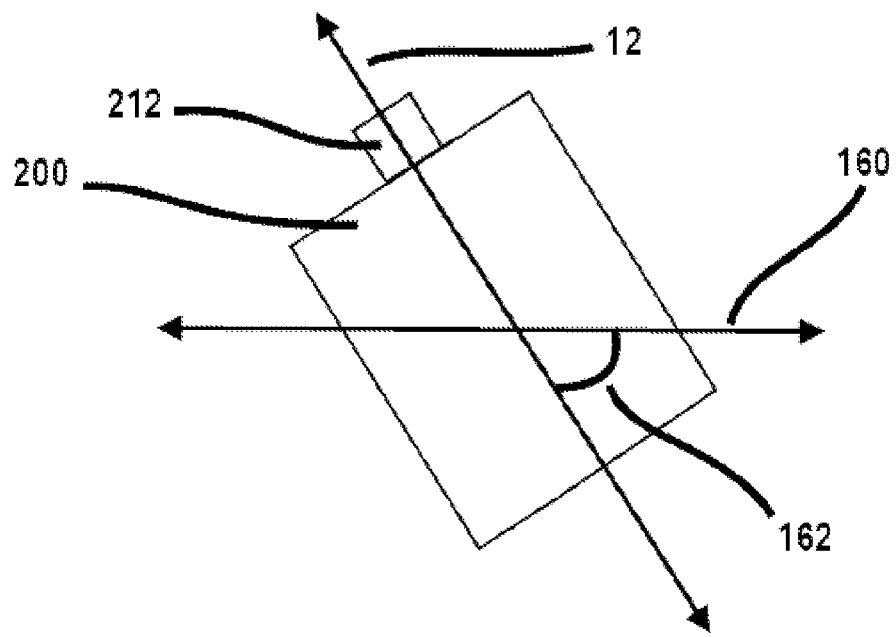
Figure 11C:
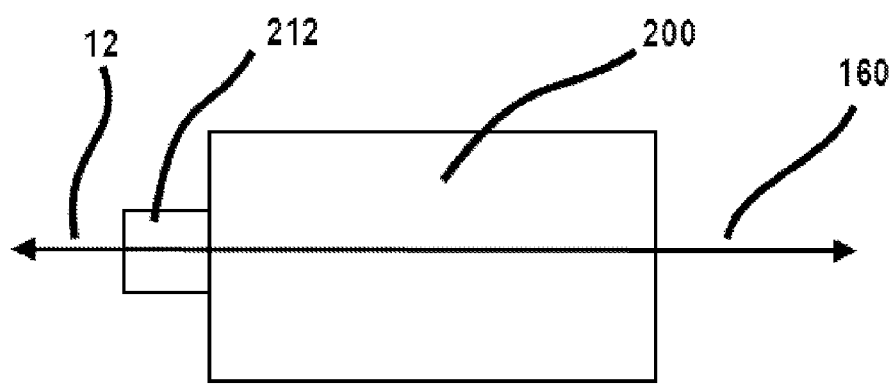
FIG. 11C depicts the core barrel holder oriented substantially parallel (and substantially within) the horizontal plane.

It is contemplated that the core barrel holder 10 can be included in a core barrel support system 150. In exemplary aspects, the core barrel support system 150 can further comprise means for securing the core barrel holder in a desired angular orientation. In these aspects, and with reference to FIGS. 11A-11C, the desired angular orientation can correspond to the angular position 162 of the longitudinal axis 12 of the core barrel holder 10 relative to a horizontal plane 160. As shown in FIG. 11C, it is contemplated that during insertion of a core barrel within the core barrel holder 10, the desired angular orientation of the core barrel holder can correspond to a position in which the longitudinal axis 12 of the core barrel holder is substantially parallel to the horizontal plane 160. In use, as shown in FIGS. 11A and 11B, during removal of a core sample from the core barrel, it is contemplated that the desired angular orientation of the core barrel holder 10 can range from about 45 degrees to about 90 degrees relative to the horizontal plane 160. FIGS. 8-10B depict the core barrel holder 10 positioned at an angle of about 90 degrees relative to the horizontal plane 160. In exemplary aspects, the desired angular orientation of the core barrel holder 10 can be about 45 degrees relative to the horizontal plane 160. However, it is contemplated that any angular orientation that permits removal of the core sample can be employed.

Figure 8:
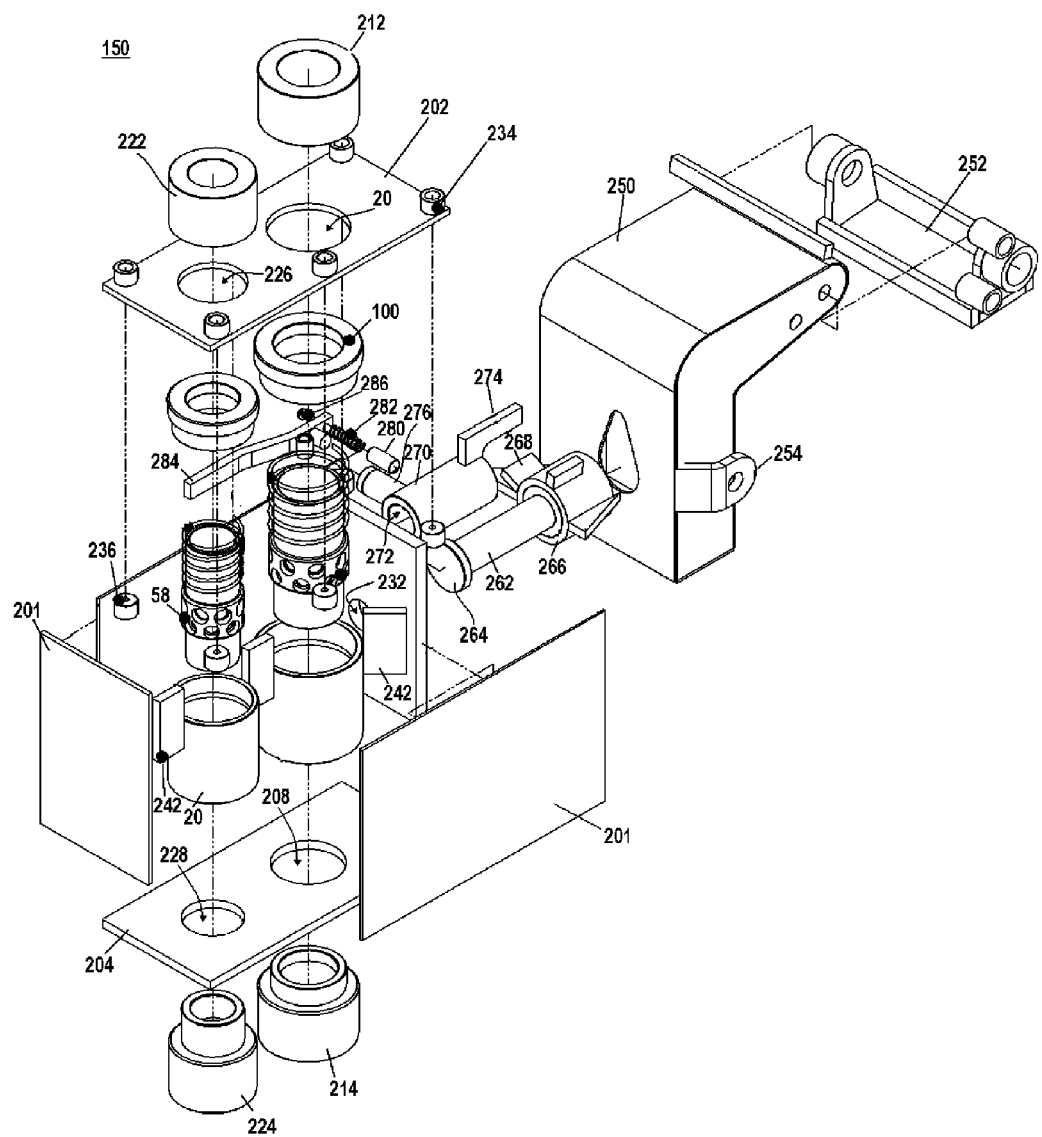
FIG. 8 displays an exploded perspective view of an exemplary core barrel support system as described herein.
Figure 9A:
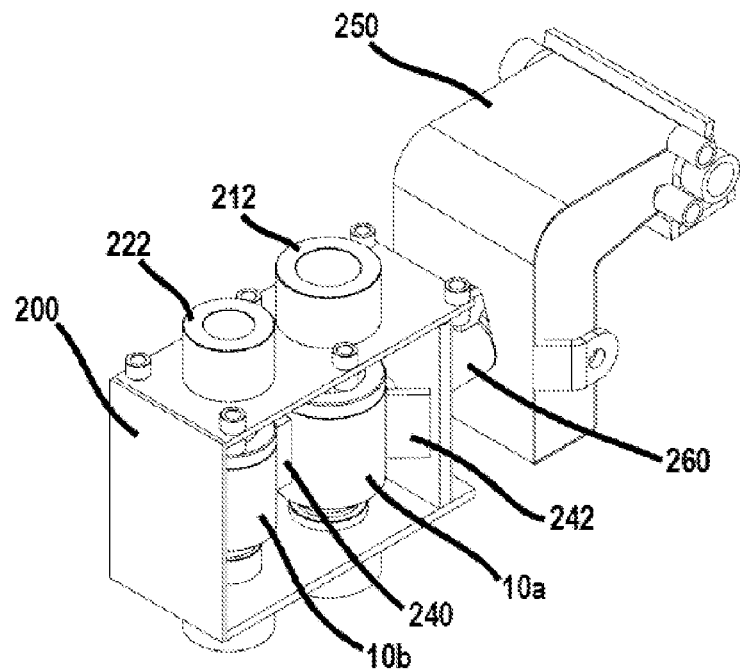
FIGS. 9A and 9B display opposing side perspective views of the core barrel support system of FIG. 8.
Figure 9B:
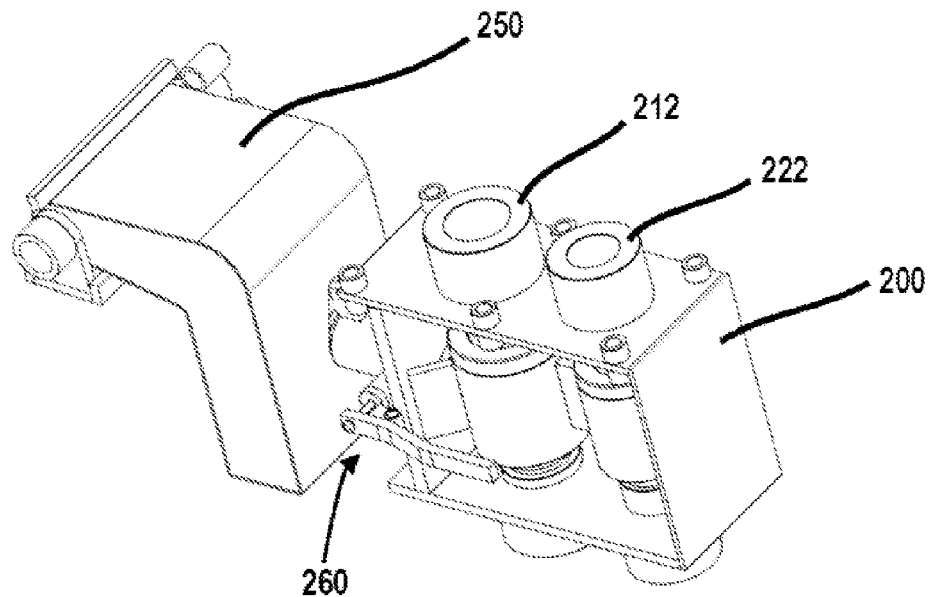
Figure 10A:
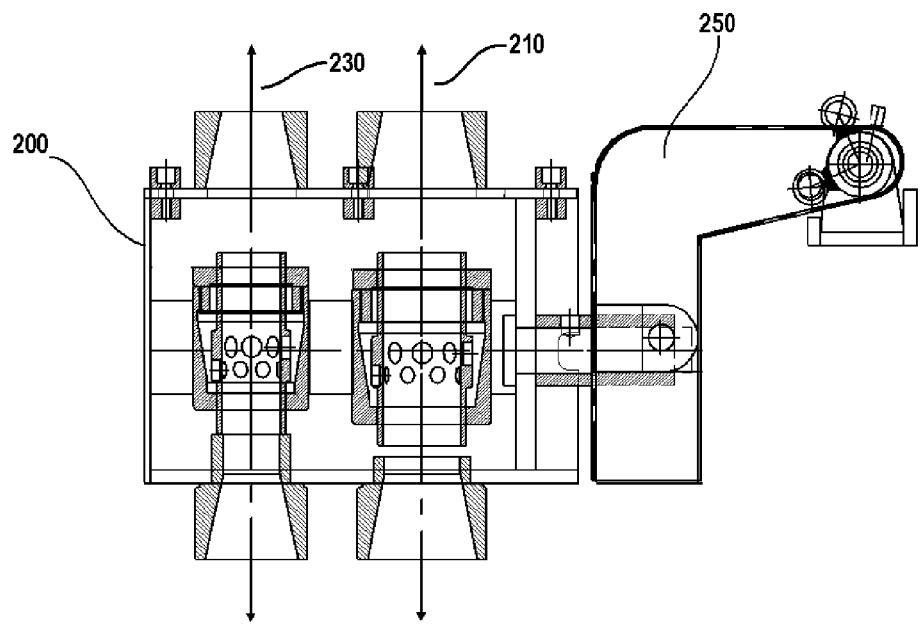
FIGS. 10A and 10B display partially transparent side and top views of the core barrel support system of FIG. 8.
Figure 10B:
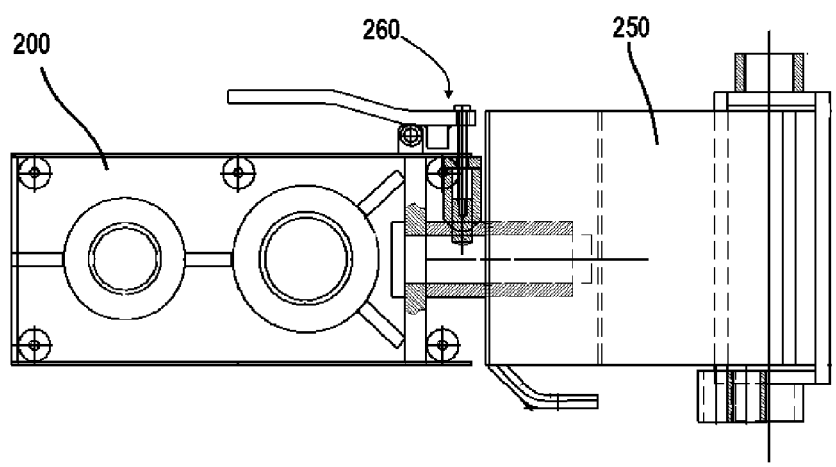

In one aspect, and with reference to FIGS. 8-10B, it is contemplated that the means for securing the core barrel holder in a desired angular orientation can comprise an enclosure 200 having a top element 202 and an opposed bottom element 204. It is further contemplated that the top element 202 can be securely coupled to the bottom element by a plurality of side walls 201. In this aspect, the top element 202 and the opposed bottom element 204 can respectively define first and second openings 206, 208, with the first opening being substantially axially aligned with the second opening relative to an orientation axis 210. It is contemplated that the core barrel holder 10 can be mounted within the enclosure 200 in the operative position such that the longitudinal axis 12 of the core barrel holder is substantially aligned with the orientation axis 210 of the first and second openings 206, 208 of the enclosure. Thus, it is contemplated that a core barrel 10 can be advanced through the first opening 206 of the enclosure 200, through the core barrel holder 10, and then through the second opening 208 of the enclosure. Optionally, the means for securing the core barrel holder in the desired angular orientation can comprise external sleeves 212, 214 configured for secure positioning within the first and second openings 206, 208 and defining central bores that are configured to receive at least a portion of a core barrel. It is contemplated that the openings of the external sleeves 212, 214 can be substantially axially aligned with orientation axis 210. Optionally, portions of each the external sleeves 212, 214 can extend within the enclosure 200 and be configured for operative coupling to the core barrel holder 10, thereby providing additional support to at least one of the core barrel holder and a core barrel positioned within the core barrel holder. In exemplary aspects, as shown in FIG. 8, at least one side wall 201 of the enclosure 200 can define an opening 232 configured to permit coupling between the enclosure 200 and a stationary object. In other exemplary aspects, and with reference to FIGS. 11A-11C, the enclosure 200 can be configured for rotational movement about an axis of rotation, thereby permitting positioning of the core barrel holder in the desired angular orientation.

Optionally, as shown in FIGS. 8-10B, the top element 202 and the opposed bottom element 204 of the enclosure 200 can respectively define third and fourth openings 226, 228, with the third opening being substantially axially aligned with the fourth opening relative to a second orientation axis 230. It is contemplated that the third and fourth openings 226, 228 can be of a different size than the first and second openings 206, 208, thereby allowing a core barrel holder 10b of a different size than core barrel holder 10a to be inserted within the enclosure 200. In exemplary aspects, when the core barrel support system 150 comprises a first core barrel holder 10a and a second core barrel holder 10b, it is contemplated that the two core barrel holders can be secured together using a brace 240 as depicted in FIG. 9A. It is further contemplated that the two core barrel holders 10a, 10b can be securely coupled to the enclosure 200 using one or more lateral supports 242. It is further contemplated that the enclosure 200 can define at least one additional pair of axially aligned openings as described herein to permit insertion of additional core barrel holders of various sizes within the enclosure.

Optionally, as shown in FIG. 8, the top element 202 of the enclosure 200 can be stabilized by a plurality of fasteners spaced about the periphery of the top element. In exemplary aspects, the plurality of fasteners can comprise a plurality of bolts 234 extending through corresponding bores defined by the top element 202 and a plurality of nuts 236 configured to receive at least a portion of the bolts after the bolts are passed through the bores defined by the top element.

In another exemplary aspect, and with reference to FIGS. 8-10B, it is contemplated that the means for securing the core barrel holder in a desired angular orientation can comprise a mount 250 configured for secure coupling to a stable and stationary object, such as, for example and without limitation, a drilling apparatus, a vehicle, and the like. In this aspect, it is contemplated that the mount 250 can comprise one or more engagement features 254 that are configured to permit secure attachment of the mount 250 to the stationary object. Optionally, in a further aspect, it is contemplated that the mount 250 can comprise a bracket 252 that is configured for pivotal connection to a drill rod sloop. In exemplary aspects, an outer surface of the mount 250 can define an opening 256 that permits coupling between the enclosure 20 and the mount 250. Although FIGS. 8-10B depict the mount 250 as having an L-shape configuration, it is contemplated that the mount 250 can have any shape that permits secure attachment of the mount to a selected stationary object.

In an additional aspect, and with reference to FIGS. 8-10B, the means for securing the core barrel holder in a desired angular orientation can comprise a coupling assembly 260 that is configured to rotationally couple the enclosure 200 (and thus, core barrel holder 10) to the mount 250 (and thus, a selected stationary object to which the mount is attached). It is contemplated that the coupling assembly 260 can comprise any known means for coupling a first object to a second object such that the first object is configured for rotation relative to the second object. In exemplary aspects, the coupling assembly 260 can comprise a first coupling member 262 and a second coupling member 270. In these aspects, a central portion of the first coupling member 262 can be positioned within a bore 272 defined by the second coupling member 270. In another aspect, the first coupling member 262 can define a first end portion 264 and a second end portion 266 that are positioned on opposed sides of the second coupling member 270. In this aspect, the first end portion 264 can be positioned within enclosure 200, and at least a portion of the second end portion 266 can be positioned within the mount 250 (or positioned proximate an internal portion of mount 250). Thus, it is contemplated that the first coupling member 262 can extend through the opening 232 defined by the enclosure 200 and the opening 256 defined by the mount 250, thereby coupling the enclosure to the mount. It is further contemplated that the first end portion 264 can have an operative diameter greater than the operative diameter of the opening 232 and that the second end portion 266 can have an operative diameter greater than the operative diameter of the opening 256.

In a further aspect, the second coupling member 270 can be configured for rotation relative to the first coupling member 262. In this aspect, it is contemplated that the second coupling member 270 can be secured to the enclosure 200 such that rotation of the first coupling member 262 results in a corresponding rotation of the enclosure 200. It is further contemplated that the second end portion 266 of the first coupling member 262 can be secured to the mount. Optionally, in one aspect, the second end portion 266 of the first coupling member 262 can define at least one projection 268. In this aspect, the second coupling member 270 can comprise an engagement element 274 configured for selective engagement with the at least one projection 268 as the second coupling member rotates relative to the first coupling member 262.

In still another aspect, the second coupling member 270 can comprise an arm 276 defining an opening configured to receive a locking pin 280. In this aspect, it is contemplated that the opening of the arm 276 can permit mechanical engagement between the locking pin 280 and the first coupling member 262. Optionally, the locking pin 280 can be loaded by a spring 282, which is in communication with a regulating screw 286. The locking pin can be advanced and retracted through movement of a handle 284 operatively coupled to the spring 282 and the pin 280.

In use, when the locking pin 280 engages the first coupling member 262, the second coupling member 270 (and enclosure 200) is locked in position relative to the first coupling member. However, when the locking pin 280 is at least partially retracted within arm 276, the second coupling member 270 can selectively rotate relative to the first coupling member 262 until the engagement element 274 contacts a projection 268 of the at least one projection of the first coupling member. In exemplary applications, upon engagement between the engagement element 274 and the projection 268, the core barrel holder 10 can be positioned at the desired angular orientation 162 relative to horizontal plane 160 (See FIGS. 11A-11C). Upon positioning of the core barrel holder 10 in the desired angular orientation 162, the locking pin 280 can be advanced within the arm 276 of the second coupling member 270 until the first coupling member 262 is engaged, thereby locking the position of the enclosure 200. It is contemplated that the first coupling member 262 can comprise at least one opening configured to receive the locking pin 280 for purposes of locking the first coupling member in place.

Optionally, in additional exemplary aspects, the core barrel support system 150 can comprise means for generating sonic energy, such as, for example and without limitation, a conventional sonic vibrator. In these aspects, it is contemplated that the sonic vibrator (or other means for generating sonic energy) can be positioned within the enclosure 200 and/or proximate the core barrel holder 10 such that the sonic vibrator, when activated, can apply sonic energy to the sample within the core barrel. It is further contemplated that upon selective activation of the sonic vibrator, the application of sonic energy to the sample within the core barrel can promote movement of the sample out of the core barrel.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A core barrel holder for supporting a core barrel during removal of a core sample from the core barrel, the core barrel holder having a longitudinal axis, the core barrel holder comprising:

a housing having a longitudinal length, a proximal surface, an outer surface, and an inner surface, the housing defining a proximal opening and a distal opening, the inner surface having a proximal portion and a distal landing portion and defining an interior space of the housing;

an inner sleeve having a longitudinal length, an outer surface, an inner surface, and a support portion, the inner sleeve defining a proximal opening and a distal opening, the inner surface of the inner sleeve defining an interior space of the inner sleeve, the support portion of the inner sleeve being positioned between the proximal and distal openings of the inner sleeve along the longitudinal length of the inner sleeve, the support portion extending radially outwardly from the outer surface of the inner sleeve relative to the longitudinal axis of the core barrel holder and defining a proximal engagement surface, a distal engagement surface, and a plurality of bores radially spaced about the longitudinal axis of the core barrel holder, each bore of the plurality of bores extending from the inner surface to the outer surface of the inner sleeve;

a plurality of support elements, each support element of the plurality of support elements being received within a respective bore of the plurality of bores of the support portion of the inner sleeve such that a portion of the support element projects inwardly from the inner surface of the inner sleeve;

a spring having a proximal end and a distal end; and a cap having an inner surface, an outer surface, and a proximal lip portion and defining a proximal opening and a distal opening, the proximal lip portion extending radially inwardly from the inner surface of the cap relative to the longitudinal axis of the core barrel holder, thereby defining an inner engagement surface, wherein, in an operative position of the core barrel holder, the inner sleeve is received through the proximal opening of the housing such that the support portion of the inner sleeve is positioned within the interior space of the housing, the spring is positioned such that the distal end of the spring engages the proximal engagement surface of the support portion of the inner sleeve, the outer surface of the cap engages the proximal portion of the inner surface of the housing, and the inner engagement surface of the lip portion engages the proximal end of the spring, and wherein, in the operative position of the core barrel holder, the proximal opening of the inner sleeve is configured to receive the core barrel, and, upon advancement of the core barrel through the interior space of the inner sleeve relative to the longitudinal axis of the core barrel holder, the distal engagement surface of the support portion of the inner sleeve is configured to engage the distal landing portion of the housing, and the plurality of support elements are configured to frictionally engage the core barrel within the interior space of the inner sleeve.

2. The core barrel holder of claim 1, wherein the inner surface of the housing has a central portion positioned between the proximal portion and the distal landing portion of the inner surface along the longitudinal length of the housing, the central portion being inwardly tapered relative to the longitudinal axis of the core barrel holder moving along the longitudinal length of the housing from the proximal portion of the inner surface toward the distal landing portion of the inner surface.

3. The core barrel holder of claim 1, wherein the proximal portion of the inner surface of the housing is threaded, wherein the outer surface of the cap has a distal threaded portion, and wherein, in the operative position of the core barrel holder, the distal threaded portion of the cap engages the proximal portion of the inner surface of the housing.

4. The core barrel holder of claim 1, wherein the proximal lip portion of the cap extends radially outwardly from the outer surface of the cap relative to the longitudinal axis of the core barrel holder, thereby defining an outer engagement surface, and wherein, in the operative position of the core barrel holder, the outer engagement surface of the cap is configured for engagement with the proximal surface of the housing.

5. The core barrel holder of claim 1, wherein a portion of each support element of the plurality of support elements projects outwardly from the outer surface of the inner sleeve.

6. The core barrel holder of claim 1, wherein each support element of the plurality of support elements is moveable within a respective bore of the plurality of bores of the support portion of the inner sleeve.

7. The core barrel holder of claim 1, wherein the plurality of support elements comprises a plurality of balls.

8. The core barrel holder of claim 7, wherein the plurality of bores of the support portion of the inner sleeve comprises a first row of bores and a second row of bores, the first row of bores being offset from the second row of bores along the longitudinal length of the inner sleeve.

9. The core barrel holder of claim 8, wherein the first row of bores comprises a plurality of bores having a first diameter, wherein the second row of bores comprises a plurality of bores having a second diameter, the first diameter being different from the second diameter.

10. The core barrel holder of claim 9, wherein the first row of bores is positioned between the proximal engagement surface of the support portion of the inner sleeve and the second row of bores along the longitudinal length of the inner sleeve, and wherein the first diameter is larger than the second diameter.

11. The core barrel holder of claim 10, wherein the balls of the plurality of balls positioned within the first row of bores have a first diameter, wherein the balls of the plurality of balls positioned within the second row of bores have a second diameter, and wherein the first diameter is greater than the second diameter.

12. The core barrel holder of claim 7, wherein the support portion of the inner sleeve comprises a plurality of projections, each projection of the plurality of projections being defined within each bore of the plurality of bores, each projection of the plurality of projections radially surrounding at least a portion of a respective bore, the plurality of projections being positioned proximate the outer surface of the inner sleeve and being configured to retain the plurality of balls within the plurality of bores.

13. The core barrel holder of claim 1, wherein the support portion of the inner sleeve has an outer diameter, wherein the distal opening of the housing has a diameter, and wherein the outer diameter of the support portion of the inner sleeve is greater than the diameter of the distal opening of the housing.

14. The core barrel holder of claim 13, wherein the proximal opening of the cap has a diameter, the diameter of the proximal opening of the cap being greater than the outer diameter of the inner sleeve.

15. The core barrel holder of claim 4, wherein the proximal lip portion of the cap has an outer diameter, wherein the outer surface of the housing defines an outer diameter of the housing, and wherein the outer diameter of the proximal lip portion is substantially equal to the outer diameter of the housing such that, in the operative position of the core barrel holder, the proximal lip portion is substantially flush with the outer surface of the housing.

16. A core barrel holder for supporting a core barrel during removal of a core sample from the core barrel, the core barrel holder having a longitudinal axis, the core barrel holder comprising:
  a housing having a longitudinal length, an outer surface, and an inner surface, the housing defining a proximal opening and a distal opening, the inner surface having a distal landing portion and defining an interior space of the housing;
  an inner sleeve having a longitudinal length, an outer surface, an inner surface, and a support portion, the inner sleeve defining a proximal opening and a distal opening, the inner surface of the inner sleeve defining an interior space of the inner sleeve, the support portion of the inner sleeve being positioned between the proximal and distal openings of the inner sleeve along the longitudinal length of the inner sleeve, the support portion extending radially outwardly from the outer surface of the inner sleeve relative to the longitudinal axis of the core barrel holder and defining a proximal engagement surface, a distal engagement surface, and a plurality of bores radially spaced about the longitudinal axis of the core barrel holder, each bore of the plurality of bores extending from the inner surface to the outer surface of the inner sleeve;
  a plurality of support elements, each support element of the plurality of support elements being received within a respective bore of the plurality of bores of the support portion of the inner sleeve such that a first portion of the support element projects inwardly from the inner surface of the inner sleeve; and
  means for axially biasing the support portion of the inner sleeve toward the distal landing portion of the housing relative to the longitudinal axis of the core barrel holder,
  wherein, in an operative position of the core barrel holder, the inner sleeve is received through the proximal opening of the housing such that the support portion of the inner sleeve is positioned within the interior space of the housing, and wherein, in the operative position of the core barrel holder, the proximal opening of the inner sleeve is configured to receive the core barrel, and, upon advancement of the core barrel through the interior space of the inner sleeve relative to the longitudinal axis of the core barrel holder, the distal engagement surface of the support portion is configured to engage the distal landing portion of the housing, and the plurality of support elements are configured to frictionally engage the core barrel within the interior space of the inner sleeve.

17. The core barrel holder of claim 16, wherein the plurality of support elements comprises a plurality of balls.

18. The core barrel holder of claim 17, wherein the plurality of bores of the support portion of the inner sleeve comprises a first row of bores and a second row of bores, the first row of bores being spaced from the second row of bores along the longitudinal length of the inner sleeve.

19. A core barrel support system for supporting a core barrel during removal of a core sample from the core barrel, the core barrel support system comprising a core barrel holder having a longitudinal axis, the core barrel holder comprising:

a housing having a longitudinal length, an outer surface, and an inner surface, the housing defining a proximal opening and a distal opening, the inner surface having a distal landing portion and defining an interior space of the housing;

an inner sleeve having a longitudinal length, an outer surface, an inner surface, and a support portion, the inner sleeve defining a proximal opening and a distal opening, the inner surface of the inner sleeve defining an interior space of the inner sleeve, the support portion of the inner sleeve being positioned between the proximal and distal openings of the inner sleeve along the longitudinal length of the inner sleeve, the support portion extending radially outwardly from the outer surface of the inner sleeve relative to the longitudinal axis of the core barrel holder and defining a proximal engagement surface, a distal engagement surface, and a plurality of bores radially spaced about the longitudinal axis of the core barrel holder, each bore of the plurality of bores extending from the inner surface to the outer surface of the inner sleeve;

a plurality of support elements, each support element of the plurality of support elements being received within a respective bore of the plurality of bores of the support portion of the inner sleeve such that a first portion of the support element projects inwardly from the inner surface of the inner sleeve; and means for axially biasing the support portion of the inner sleeve toward the distal landing portion of the housing relative to the longitudinal axis of the core barrel holder, wherein, in an operative position of the core barrel holder, the inner sleeve is received through the proximal opening of the housing such that the support portion of the inner sleeve is positioned within the interior space of the housing, and wherein, in the operative position of the core barrel holder, the proximal opening of the inner sleeve is configured to receive the core barrel, and, upon advancement of the core barrel through the interior space of the inner sleeve relative to the longitudinal axis of the core barrel holder, the distal engagement surface of the support portion is configured to engage the distal landing portion of the housing, and the plurality of support elements are configured to frictionally engage the core barrel within the interior space of the inner sleeve; and means for securing the core barrel holder in a desired angular orientation, the desired angular orientation corresponding to the angular position of the longitudinal axis of the core barrel holder relative to a horizontal plane.

20. The core barrel support system of claim 19, wherein the desired angular orientation of the core barrel holder ranges from about 45 degrees to about 90 degrees relative to a horizontal plane.

* * * * *